United States Patent [19]
Westphal et al.

[11] Patent Number: 4,468,864
[45] Date of Patent: Sep. 4, 1984

[54] TILT METER

[75] Inventors: James A. Westphal, Altadena; Michael A. Carr, La Crescenta, both of Calif.

[73] Assignee: California Institute of Technology, Pasadena, Calif.

[21] Appl. No.: 365,261

[22] Filed: Apr. 5, 1982

[51] Int. Cl.³ ............................................. G01C 9/06
[52] U.S. Cl. ....................................... 33/366; 33/1 H
[58] Field of Search ................ 33/366, 381, 382, 1 H; 340/665, 689; 73/105

[56] References Cited

U.S. PATENT DOCUMENTS

| | | | |
|---|---|---|---|
| 2,713,726 | 7/1955 | Dixson | 33/366 |
| 3,114,209 | 12/1963 | Foody et al. | 33/366 |
| 4,346,363 | 8/1982 | Wilhelmson | 33/366 X |
| 4,378,693 | 4/1983 | Ratcliffe | 340/689 X |

Primary Examiner—Harry N. Haroian
Attorney, Agent, or Firm—Freilich, Hornbaker, Rosen & Fernandez

[57] ABSTRACT

A tilt meter comprises two tilt sensors (110 and 110S, see FIG. 7) in a housing (105). Each sensor acts as two variable resistors ($R_s$), which together with two fixed resistors ($R_F$) form a Wheatstone bridge (25), driven by a square wave signal from a drive source (30). The output of the bridge is fed to an electronic circuit (35) which includes a synchronized switch (43) to cut out the spikes (50), which the bridge outputs at the transitions of the square wave. The output of the electronic circuit is a DC signal, whose amplitude indicates tilt magnitude and polarity indicates direction of tilt. The housing (105) is supported on a support surface (102S) by means of 15 legs (116, 117) threaded into nuts of the same metal, and which has a very low thermal coefficient of expansion.

17 Claims, 12 Drawing Figures

FIG. 4
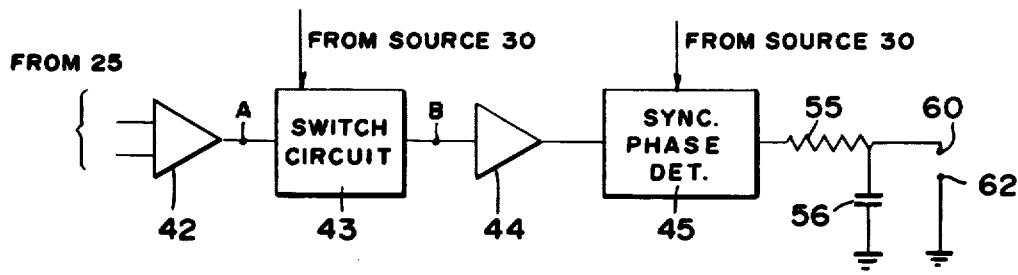
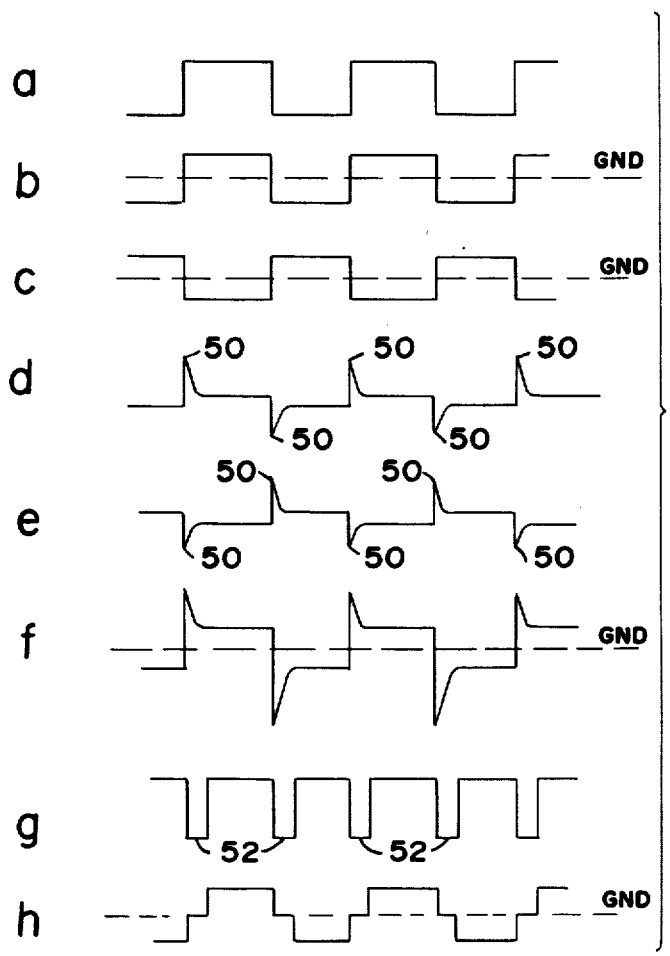
FIG. 5

TILT METER

FIELD OF THE INVENTION

The present invention generally relates to a tilt sensing device and, more particularly, to a tilt meter, particularly adapted to measure tilt of terrestial surfaces and the like.

DESCRIPTION OF THE PRIOR ART

There are various phenomena on Earth which cause the inflation or deflation of the earth surface at or relative near the place where the phenomena take place. For example, in a volcano, magma, from deep inside the earth, tends to flow upwardly through one or more vents into a porous chamber, relatively near the earth surface. As more magna flows upwardly, the formation around the chamber tends to break up and becomes porous to accommodate more magma. This phenomenon, which is well known, typically causes the earth surface to tilt above or about the magma-filling chamber. By accurately measuring the surface tilting and producing a tilt profile, one can derive significant information as to the magma flow, deep below the surface, and thereby be able to determine and/or predict volcano activity.

The tilting of the earth surface can be measured with a tilt meter. At present, various tilt meters are in use for measuring tilt of various surfaces, including that of the earth surface. As to those used to measure tilt of other than earth surface, e.g. leveling of mchinery, they are not designed to sense the extremely small levels of tilt which the earth surface undergoes. e.g. $100 \times 10^{-6}$ radians. Also, since such meters are usually in a relatively controlled environment, e.g. relatively uniform temperature, compensation or elimination of measurement errors due to environmental changes are not considered.

Some tilt meters have been developed to measure earth surface tilting, a field to which the present invention is directed. However, these prior art meters suffer from several significant disadvantages. They are quite expensive, generally priced at thousands of dollars, e.g. $7,000.-$10,000. Consequently, using a very large number of these devices in order to obtain an accurate tilt profile over a large area becomes prohibitive. Also, in spite of their price, the masurements which these meters are capable of providing are not sensitive enough nor sufficiently accurate, due to the meter's sensitivity to environmental changes.

A need therefore exists for a tilt meter which overcomes the disadvantages, characterizing prior art tilt meters.

OBJECTS AND SUMMARY OF THE INVENTION

A primary object of this invention is to provide a novel and unobvious tilt meter which overcomes the disadvantages of prior art tilt meters.

Another object of the present invention is to provide a new tilt meter, particularly adapted to measure tilt of the earth surface.

A further object of the present invention is to provide an inexpensive tilt meter particularly designed to sense earth surface tilt and provide very accurate measurements thereof.

These and other objects of the invention are achieved by providing a tilt meter which incorporates at least one tilt sensor. From an electrical point of view, the sensor serves as two serially-connected variable resistors. When the sensor tilts in one direction about an axis, perpendicular to its longitudinal axis, the resistance of one of the resistors increases while that of the other decreases, and when tilting takes place in the opposite direction, the resistance of the former decreases and that of the later increases. Both magnitude and direction of tilt are directly related to the magnitudes of resistance changes and directions of changes, i.e. the resistance of which resistors increases with respect to the other.

Electrically, the sensor, acting as two variable resistors, is connected with two other resistors to form a wheatstone bridge which is driven by an AC source. The bridge is connected to circuitry to provide an output whose amplitude is directly related to tilt magnitude and polarity to tilt direction. Novel and unobvious means are included to eliminate or at least greatly reduce errors in the output as a result of electrical and or mechanical problems.

BRIEF DESCRIPTION OF THE DRAWINGS

FIG. 4 is a more detailed yet simplified diagram of circuit 35 shown in FIG. 2;

FIG. 5 is a multiuniform diagram useful in explaining a significant feature of the invention;

DETAILED DESCRIPTION OF THE PREFERRED EMBODIMENTS

The present invention will first be described in connection with its application to measure the magnitude(s) and direction(s) of tilting of the surface of a volcano. However, as will be appreciated, the invention, i.e. the tilt meter, can be used wherever surface tilt measurements are desired.

Figure 1:
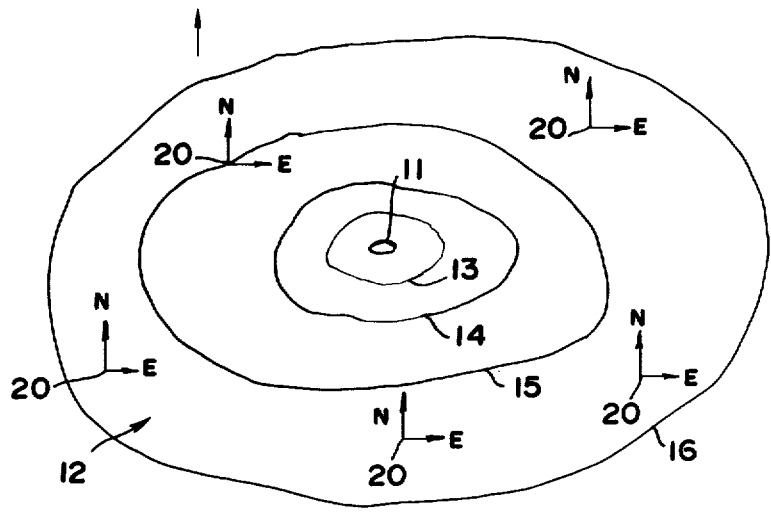
FIG. 1 is a top topographical view of a volcano.

Attention is first directed to FIG. 1 which is a simplified top view of a volcano, with its crater 11 and surface 12. The various lines 13-16 represent elevation lines. It has been reasonably established that the tilting of the volcano surface 12 is related to its activity. For example, in a volcano magma often flows from deep within the volcano through vents to a porous chamber below the crater. The chamber tends to expand in size as more magma flows thereinto. Such magma flow causes the volcano surface to swell, thus resulting in surface tilting. Just prior to an eruption the magnitudes of the surface tilting may be quite significant, e.g. $1000 \times 10^{-6}$ radians. However, even before an eruption volcano activity causes extremely small surface tilting which, if detected and measured, can provide significant scientific data relating to the volcano's activity and also predict the likelihood of an eruption. It is of course desirable to be able to measure tilting magnitudes as small as possible. With the novel tilt meter of the present invention, surface tilt as small as $10^{-7}$ radians can be accurately detected.

If one knew ahead of time the tilt direction then theoretically meters with sensors positioned to detect the tilt only in the known direction can be used. However, in reality, the tilt directions are not known. Therefore, preferably, the tilt meter includes two sensors designed and oriented to sense tilt in two orthogonal axes. Therefrom, tilt in any other direction can be determined by vector analysis.

In FIG. 1, each of numerals 20 designates a tilt meter, represented by two orthogonal arrows. In order to obtain a tilt profile a considerable number of meters need be placed on the volcano surface 12 at different locations. Preferably, all the meters are positioned so that their sensors are aligned about the same orthogonal axes, such as North-South (N-S) and East-West (E-W), as shown in FIG. 1.

At present, several types of electrolytic or electrically conductive sensors, which, when tilted, provide an output which is directly related to tilt magnitude, are available commercially. Basically, each sensor can be viewed as two-serially connected variable resistors. When the sensor is perfectly level, the resistors have equal resistances. On the other hand, when the sensor is tiled in one direction, the resistances vary. The resistances of one of the resistors increases and that of the other decreases. The opposite happens when the sensor tilts in the opposite direction. To detect tilt, about two orthogonal axes, two sensors fixedly oriented in the two orthogonal axes are used, with separate electronics being associated with each sensor.

Figure 2:
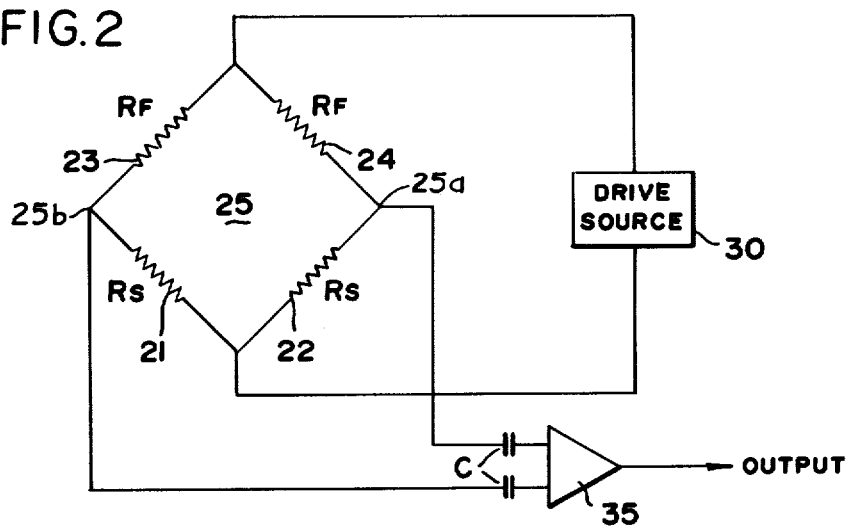
FIG. 2 is a simplified diagram of the meter of the present invention.

Attention is now directed to FIG. 2, which is a simplified diagram of the electronics associated with one sensor. Therein a tilt sensor is represented by two variable resistors $R_S$, where the subscript S designates the sensor, and the resistors are also designated by numerals 21 and 22. They are connected with two resistors 23 and 24 of fixed resistances, also designated by $R_F$ (F for fixed), to form a wheatstone bridge 25. The bridge is driven by a drive source 30 which is connected to the junction points of the two fixed resistor $R_F$ and the two variable resistors $R_S$. The other two junction points of the bridge are connected to an electrical circuit 35, the details of which will be described hereafter in detail.

Preferably, the source 30 should be a DC source. However, such a source cannot be used for the following reasons. The sensor contains a liquid, which is electrically conductive. Typically, it contains ionizable matter dissoled in water. Thus, if the bridge were driven by a DC source, the water would tend to separate into hydrogen and oxygen and would thereby effectively destroy the sensor. Consequently, the bridge must be driven by an AC source. Also, the use of an AC source 30 provides additional advantages. It enables the bridge output to be amplified by circuit 35 and by detecting the phase of the output of circuit 35, with respect to the AC source signal, one can determine which of resistors 21 and 22 is high and which is low and thus determine the direction of tilt, while the tilt magnitude is provided by the magnitude of a DC output of circuit 35. Since the bridge is driven by AC, in FIG. 2, the bridge output is shown fed to circuit 35 through DC blocking capacitors C. However, as will be pointed out hereafter DC blocking by other than the capacitors can be used.

Figure 3:
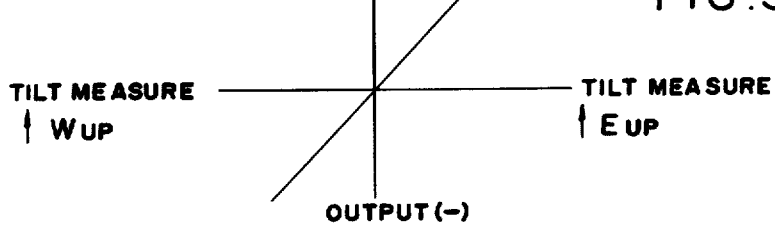
FIG. 3 is a diagram useful in explaining the phase and amplitude features of the meter's output signal.

FIG. 3 is a simplified diagram of the DC output of circuit 35 represented by line 40 for a West-East tilt sensing, in which it is assumed that when the output is in phase with the driving signal from source 30, it indicates tilt in the East direction i.e., East Up and when the output is out of phase, it indicates tilting in the West direction, i.e. West up.

The bridge is typically driven with a square wave, which in one embodiment was of a frequency of about 1 KHz. However, lower frequencies e.g. 20-30 Hz can be used, since the tilt to be measured has a period typically on the order of several minutes.

Although the AC driving of the bridge provides several advantages, as herebefore pointed out, it also creates certain serious problems, which must be solved, if the meter is to provide the extremely low, yet precise measurements. When the bridge is driven by AC, it acts not only as a resistor bridge, but also a capacitor type bridge. This is due to distributed and stray capacitance about the resistors, sensors and all the wiring from the sensors to the circuitry 35.

In principle, one can try and balance the bridge. However, any small change would produce an imbalance. For example, any bending of any of the wires from the bridge to circuit 35 or to source 30 would result in an imbalance. Also, the stray capacitance is highly temperature sensitive. Thus, any temperature change in the environment, wherein the meter is located, such as on the volcano surface, would imbalance the bridge. This would place a severe limitation on the meter sensitivity.

This problem and the novel and unobvious manner in which it is solved may best be explained in connection with FIGS. 4 and 5. FIG. 4 is a more detailed diagram of circuit 35, shown including a differential operational amplifier 42 to which the bridge output is supplied, a switch circuit 43, an amplifier 44 and a synchronous phase detector 45, whose output represents the DC output of circuit 35, represented in FIG. 3 by line 40. FIG. 5 is a diagram of a plurality of waveforms, useful in explaining the manner in which the above described problem is solved.

Briefly, AC square wave driving signal from source 30, which is shown in line a of FIG. 5, is applied to the bridge 25. The bridge 25 produces a square-wave shaped output, which is amplified by amplifier 42. Its output at point A can be in phase or out of phase with the driving AC signal, depending on the direction of tilt. In lines b and c of FIG. 5 the output at point A of amplifier 42 is shown for in-phase and out-of-phase conditions.

As long as the tilt is reasonably large, the fact that the bridge is driven by an AC source does not create any problems. However, when the tilt is very small, due to the high frequency components of the driving square wave, sharp spikes occur at the bridge output at the transition times of the driving square wave. These spikes are designated by numerals 50 in lines d and e of FIG. 5 for in-phase and out-of-phase bridge outputs. When the bridge output is amplified, (see line f) the spikes 50 are greatly amplified and often dominate the otherwise low level output. Thus, the meter output is not truly representative of the tilt magnitude, but rather is distorted by the bridge stray capacitance, which as previously pointed out is temperature sensitive, and therefore cannot be calibrated sufficiently accurately, when extremely sensitive tilt measurements are sought.

This problem is overcome by applying the output of amplifier 42, i.e. the signal at point A (See FIG. 5 line f) to the input (point B) of the next amplifier 44 through the switch circuit 42, which is synchronized with the drive source 30. The switch circuit connects point A to point B during each half cycle of the driving square wave, except for a preselected short period starting with each transition, whether positive or negative, of the driving signal.

During each of these periods, point B, i.e. the input of amplifier 44, instead of being connected to point A to receive the amplified bridge output, is connected to ground. These periods are designated in line g of FIG. 5 by numerals 52. Since the spikes 50 occur during the transitions of the driving signal, by grounding the input of amplifier 44 for periods starting with each of the transitions, the amplified spikes 50 at point A are prevented from reaching the input B of amplifier 44. Thus, they are prevented from adversely affecting the meter's output and therefore do not affect its sensitivity. The length of each of periods 52 is chosen to be not less than the longest expected duration of any of spikes 50.

Except during periods 52, the output of amplifier 42 at point A is applied to the input at point B of amplifier 44. For the particular waveform at point A, shown in line f of FIG. 5, the signal applied at point B to the input of amplifier 44 is shown in line h of FIG. 5. This input is then amplified by amplifier 44, whose output is applied to the synchronous phase detector 45, which also receives a signal from the driving source 30.

Basically, the output of the phase detector is a DC signal except for gaps corresponding to periods 52, which when integrated by the resistor 55 and capacitor 56 results in a DC signal across output terminals 60 and 61, the latter being connected to ground. As diagrammed in FIG. 3, the polarity of the DC signal 40, depends on the phase relationship between the driving square wave of source 30 and the bridge output, thereby indicating which direction is up. In FIG. 3, it is assumed that when the output polarity is plus (+), representing an in-phase condition, East is up, and when the output polarity is negative (−), representing an out-of-phase condition, West is up. The magnitude of the output signal is directly related to tilt magnitude.

Figure 6:
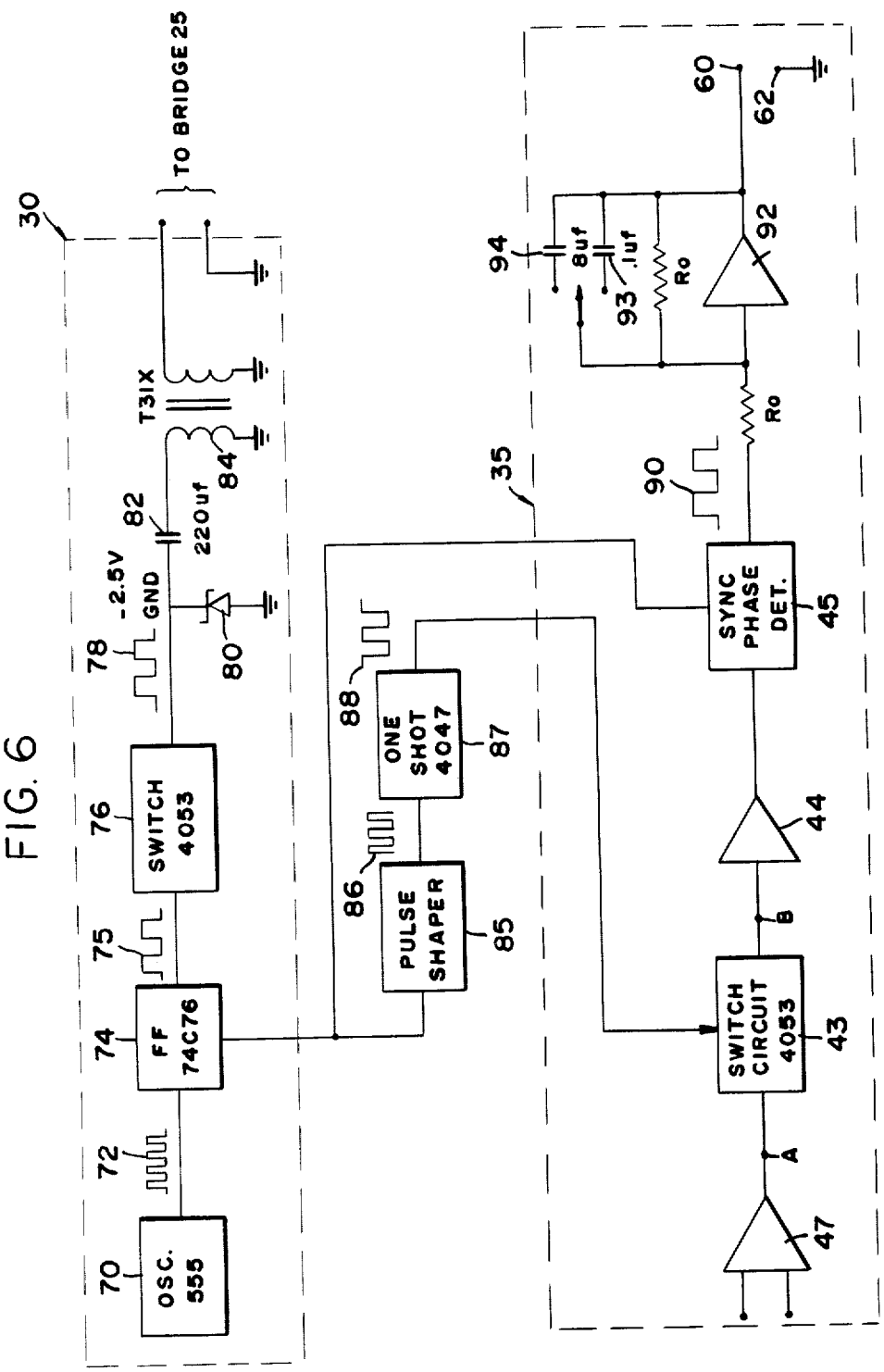
FIG. 6 is a detailed diagram of the electronics used in any embodiment actually reduced to practice.

It should be appreciated that the circuitry, herebefore described is easily implementable, by those familiar with the art, with components and devices such as an oscillator, a flip flop a one shot, a differential operational amplifier and a synchronous phase detector, all of which are available commercially. In FIG. 6, circuitry, which was actually used in reducing the invention to practice, will be described for explanatory purposes only, rather than to limit the invention thereto.

Therein, the drive source 30 and circuit 35 are shown in greater detail. The drive source 30 is implemented by a 555 type oscillator, designated by numeral 70, which produces short duration pulses 72, e.g. 2 KHz, which are applied to a flip flop (FF) 74 of the 74C76 type. Thus, the output of FF 74 is a 1 KHz square wave designated by numeral 75. It is applied to a switch 76, of the 4053 type, which produces a square wave, varying between ground and −2.5 V and is designated by 78. A zener diode 80 of the type LM 336 is connected between the switch output and ground to limit the switch output to vary only between ground and +2.5 V. The switch output is fed through a capacitor 82 of 220 $\mu f$ to a small 1:1 transformer 84 of the T31X type. The output of the latter is a square wave varying between +1.25 V and −1.25 V. The capacitor 82 and transformer 84 serve as a very good DC filter, to insure that the square wave, which is applied to the bridge 25 does not have any DC component, which if present, would disassociate the water in the sensor liquid and thus would destroy its usefulness. The output of the FF 74 is also applied to the synchronous phase detector 45 of circuitry 35 for phase comparison. In addition, FF 74 is used to drive a pulse shaper 85, which produces sharp pulses 86 each transition of the FF state, i.e. at each transition of the square wave. These pulses 86 are fed to a one shot 87 of the 4047 type. It produces pulses 88 of a fixed period, adjusted to be not less than the longest expected sharp spike 50 from the bridge, herebefore discussed. Pulses 88 are applied to the switch circuit 43 which is also implemented with a 4053 type circuit. It is during the duration of each pulse 88 that switch 43 grounds the input B of amplifier 44 to ground.

As to the output of the synchronous phase detector 45, shown in FIG. 6 by the waveform 90, unlike the arrangement shown in FIG. 4, for explanatory purposes, wherein it is applied to the output terminals 60 and 62 through resistor 55 and capacitor 56, in the embodiment reduced to practice, it is actually fed to a DC amplifier 92 of a gain of one (1), controlled by equal resistors $R_o$. In the embodiment reduced to practice, each resistor $R_o$ has a resistance of 10 Mohm. In addition, two capacitors 93 and 94 of values of 0.1 $\mu f$ and 8 $\mu f$ respectively, are included, to selectively provide the circuit with a filtering time constant of either 1 second or 80 seconds. The 1 second time constant is used when positioning or leveling the meter. However, once the meter is leveled, capacitor 94 is switched into the circuit to provide a filtering time constant of about 80 seconds. Such a long time constant is useful to average out only effects on the measurements, due to other than actual surface tilting. The meter is actually a very sensitive seismometer and is insensitive to common seismic noise which is typically on the order of seconds. Unless such noise is averaged over a long time constant it would affect the final output. For example, waves bearing against a nearby beach produce microseisms of periods of several seconds. It is to eliminate the common seismic noise and other noise of periods on the order of several seconds that the long time constant of 80 seconds is used. Also, by incorporating the DC amplifier 92, the meter's output across terminals 60 and 62 is of low impedance.

When using any tilt meter and particularly the meter of the present invention with its extremely high sensitivity which is on the order of about $10^{-7}$ radians, it is important to place the meter in a horizontal plane. As to earth surface, such as the surface of a volcano or the like, a perfectly flat horizontal surface is not available. This problem may generally partially be solved by securing a flat plate onto a large rock, protruding from the surface. In one case, a floor tile was glued onto a rock on a volcano surface to serve as the base for supporting the housing containing the sensor of the meter. The bottom of the housing is preferably a steel plate, with a flat bottom.

It should be apparent that in practice neither the base plate on which the sensor housing is to be supported nor the housing bottom side can be made to be perfectly flat and horizontal, i.e. in a level position to enable the housing to be placed directy on the supporting base, so that the sensors are level to obtain extremely sensitive tilt measurement. Thus, means have to be provided to account and compensate for any misalignments, due to imperfections in the flatness of the base plate and the housing bottom side. This can best be achieved by providing the sensor housing with support legs, preferably three, whose lengths can be adjusted in order to position the housing above the base so that the sensor in the housing is perfectly in a horizontal plane, i.e. level.

At first glance, the use of variable length legs seems to be a simple solution to the problem. However, this is far from the truth. This problem may best be explained in connection with FIG. 7, wherein numeral 100 designates a rock protruding out of the volcano surface 12. A base plate, e.g. a floor tile 102 is assumed to be glued onto the rock by adhesive matter 103 so that the tile's top surface 102S, is as level as possible. It is surface 102S which serves to support the sensor housing 104 in which at least one tilt sensor 110 is supported, to sense tilting about an axis 111. Typically, however, a second sensor 110S is included. It is positioned orthogonally with respect to sensor 110 to sense tilting about an axis, which is represented by the double arrowed line 111X, and which is perpendicular to axis 111.

The housing 105 is shown having a bottom plate 112, with a bottom side 112B. Clearly, even under the best of circumstances neither side 112B is perfectly flat nor is the top surface 102S perfectly flat and horizontal. Thus, to measure tilt about axis 111, which is perpendicular to the length of the sensor 110 the housing 105 cannot be placed directly onto the surface 102S. To properly position the sensor so that it is nearly perfectly horizontal, legs, extending from the bottom plate 112, whose lengths are adjustable may be used. This can be achieved by threading the bottom plate 112 to form several nuts into which the threaded ends of several legs may extend. Preferably, three legs are used, although in FIG. 7 only two legs 116 and 117, are shown.

Figure 7:
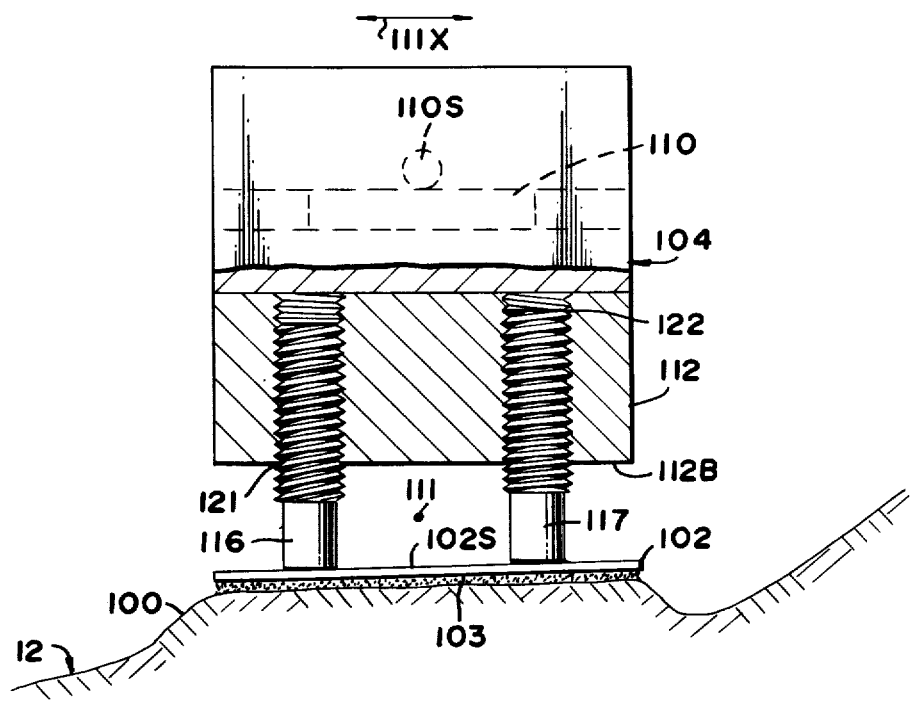
FIG. 7 shows a novel arrangement for leveling the meter housing.

As is appreciated, whenever one piece of metal is to be threaded into another, the two pieces are of different metals, in order to prevent galling. Let it be assumed that the bottom plate 112 is of one metal, e.g. steel of a known thermal coefficient of expansion (tce) and the legs are of a different metal having a different tce. Even if the threads in the plate 112 and in the legs were very fine, i.e. a large number of threads per inch and tight fitted when the housing is initially positioned or calibrated, so that the sensor is perfectly level, one cannot tell exactly where each leg makes contact with the plate 112. In all probability, the legs make contact with plate 112 at points at different depths therein. Let it be assumed that at calibration time when the temperature is $t_c$ leg 116 makes contact with plate 112 at point 121, so that its effective length to surface 102s at 1 inch, and that leg 117 makes contact at point 122 so that its effective length is two inches. Even if the tce of plate 112 were ignored, as the temperature changes from tc, e.g. increases to $tc + \Delta t$ the two legs would expand. Since their effective lengths at time of calibration were different, leg 116 being 1 inch long and leg 117 being 2 inches long, their effective lengths would increase by different amounts. Thus, the housing would tilt and therefore the previously horizontally aligned sensor would no longer be level, simply due to a temperature change. Such undesired tilting which cannot be easily premeasured is also affected by the expansion of plate 112 with its different tce. It should thus be apparent that aligning the housing 104 with an arrangement, as shown in FIG. 7 is not satisfactory.

Figure 8:
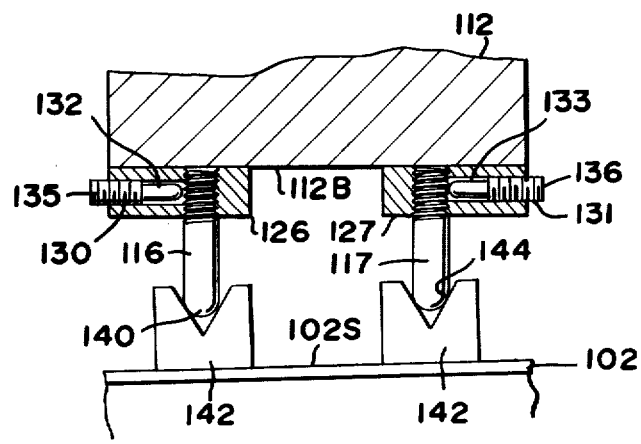
FIG. 8 is a partially sectional side view of a tilt meter mount constructed in accordance with the present invention.

In accordance with the present invention, a novel arrangement is used to align the housing 105 so that the sensor 110 (and 110S) therein is perfectly horizontal when initially positioned and remains so in spite of temperature changes. As shown in FIG. 8, in which numerals like those shown in FIG. 7 are used, the legs 116 and 117, instead of being threaded into plate 112 are threaded into nut-forming blocks hereafter referred to simply as nuts 126 and 127, which are permanently attached to the surface 112B of plate 112. Both the legs 116 and 117 and the nuts 126 and 127 are made of the same metal, thus they have the same tce. They are preferably formed of a metal with an extremely low tce, e.g. Invar which has a tce of $10^{-6}$ per degree C. As is known Invar is a nickel steel alloy.

Since the metal of which the legs and nuts are formed is the same, the threads which are very fine, e.g. 80 threads per inch are purposely loosely fitted, to minimize galling. The nuts 126 and 127 have threaded openings 130 and 131, respectively, into which nylon plugs 132 and 133 can be inserted and pressed against legs 116 and 117 by set screws 135 and 136, when the housing is positioned, so that the sensor is perfectly level. It should be pointed out that even though the exact point of contact of each leg is not known, since the legs and nuts are of the same metal and thus have the same tce only a very small tilting of the housing due to temperature changes occurs, when the metal from which the legs and nuts are formed, has a very low tce.

Figure 8A:
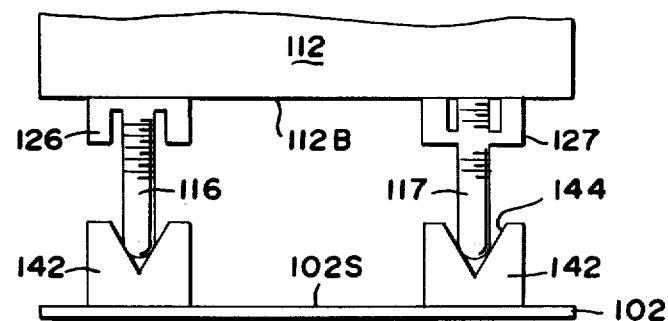
FIGS. 8a and 8b are explanatory views of FIG. 8, showing the nuts modified to illustrate what would occur under various conditions.
Figure 8B:
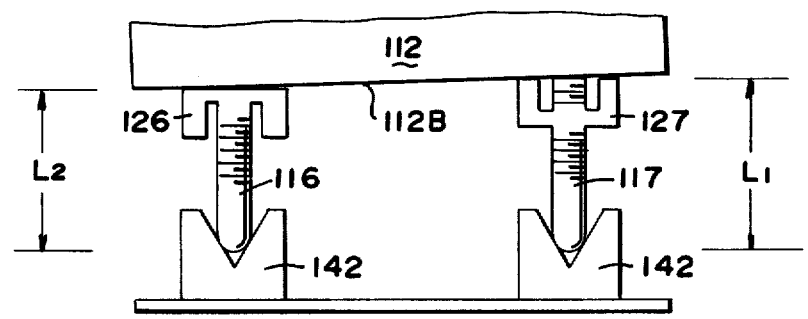

This aspect may further be explained in connection with FIGS. 8a and 8b. In FIG. 8a, it is assumed that leg 116 makes contact with nuts 126 at the top, and that leg 117 makes contact with nut 127 at the bottom. However, since each leg and nut are of the same metal, they can be regarded as one metallic piece, expanding and contracting equally. Assuming that surfaces 112B and 102S are perfectly level, then the effective lengths of the leg-nut units are the same, since they expand (or contract) by equal amounts due to temperature increases (or decreases). However, in reality, these surfaces cannot be aligned to be perfectly in a level position and therefore the legs are used to level the sensors in housing 105 as previously explained. FIG. 8b is similar to FIG. 8a, except for the case where the leg-nut units are of different effect lengths designated L1 and L2, where $\Delta z = L1 - L2$. In reality, as the temperature changes, the effective lengths of the leg-nut unit change. The change difference is $\Delta z(tec)T°$. By choosing a metal with a very small tce, such as $10^{-6} \times \Delta L/L$ per C° for Invar, this change difference is very small. Thus, a minimal tilting of the housing results from temperature changes.

Preferably, the bottom ends of the legs are hemispherical in shape as designated by numeral 140. Each bottom end is secured within a base cup 142, which has a conical cavity 144 so that each leg makes contact about a circle with its associated base cup. The function of these cups is to prevent the sliding of the legs on surface 102S to earthquakes or the like.

As previously pointed out, any sensor which is designed to sense tilt can be employed in the novel tilt meter of the present invention. However, regardless of the type of sensor used, care must be taken to insure that the sensor does not tilt within the housing due to temperature variations. If the sensor were supported on a metallic surface which is subject to corrosion, it is obvious that any corrosion would result in sensor tilting. Thus, in order to provide the meter with the high sensitivity, e.g. on the order of $10^{-7}$ radians, each sensor is placed in an appropriate groove, the surfaces of which are polished and chrome plated to prevent rust or corrosion. Likewise, all the surfaces of the metal parts forming the housing are polished and chrome plated to prevent corrosion.

Furthermore, the blocks of metal in which the grooves are formed to accommodate the sensors are selected to have a tce which is as close to that of the sensor as possible, so that once the sensors are fixedly positioned, the sensors and the metal with which they come in contact expand and contract by equal amounts, thereby insuring that the sensors remain in fixed positions within the housing. In one embodiment actually reduced to practice, the sensors were of glass and the housing metal was chosen to be of a mild steel and a tce nearly identical to that of glass, on the order of $10 \times 10^{-6} \Delta/L/C°$.

Figures 9, 10:
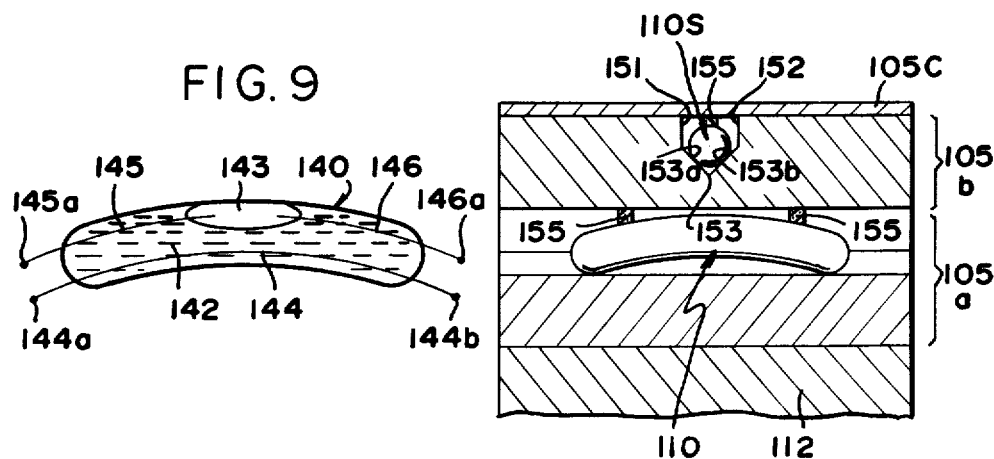
FIG. 9 is a cross sectional view of a particular tilt sensor used in an embodiment actually reduced to practice.
FIG. 10 is a cross sectional view of the housing with unique grooves to support sensors like the one shown in FIG. 9.

In the embodiment which was actually reduced to practice, a tilt sensor commercially available from The Fredericks Company of Huntington Valley, near Philadelphia, Pennsylvania were used. The sensors were used because of their reliability, yet low cost. However, due to their shapes, they presented mounting problems. Each sensor is made of glass in the shape of a tube which is curved at a radius of about 14" rather than being a straight along its longitudinal axis. FIG. 9 is a side view of such a sensor, designated by numeral 140. It is about ¼ inch in diameter and about 1¼ inch long, with a curvature of about 14 inches. It contains a conductive liquid 142 which does not fill the entire tube, thereby forming a bubble 143, similar to that in a carpenter's level. Extending through the sensor is one long wire 144, with ends, designated 144a and 144b. Also extending into the tube are two wires 145 and 146, whose outer ends are designated by 145a and 146a and whose inner ends terminate in the bubble 143, when the sensor is level. Wire ends 144a and 145a represent the ends of one of the variable resistors $R_S$ in FIG. 2 and wire ends 144b and 146a represent the ends of the other variable resistor $R_s$. In practice, ends 144a and 144b are tied together and represent the junction point of the two variable resistors $R_s$.

Since the liquid 142 is electrically conductive, the resistance between any pair of wire ends depends on the amount of liquid covering the wires, the more liquid covering the wires, the lower the resistance. The liquid also has to properly wet the wires in the tube and the inner tube surface to minimize surface tension effects. Preferably, to wet the wires and the inner tube surface, the wires and tube are thoroughly cleaned by heating or by use of an appropriate solvent, or by etching.

As to the liquid, various conductive liquids could be used, such as different alcohols, e.g. ethyl alcohol, methyl alcohol, or heavier alcohols with higher viscosity. Also, some water must be present for ionization to give the liquid its electrical conductivity. In addition, some ionic material is typically dissolved in the liquid. A material commonly used for this purpose is potassium iodide. Other materials which ionize when dissolved in water can be used, such as sodium chloride or ferric chloride. As to the bubble 143, it may be in vacuum or contain a gas, such as one of the inert gases. It may also be filled with the vapors of liquid 142.

It is well known that the preferred manner of supporting an element such as a sensor in a housing is by providing only three points of contact. However, the sensor 140, due to its curvature along its longitudinal axis, cannot be supported at three points. It cannot be supported in a conventional slot or cavity in a block of metal with either a rectangular or circular cross section. In such slots the points of contact would not be known precisely. In accordance with the present invention, the housing 104, previously shown in simplified form in FIGS. 7 and 8 includes a pair of metal blocks 105a and 105b, as shown in FIG. 10, which is a cross-sectional view of the housing, with the sensors 110 and 110S. Basically, block 105a defines a slot to accommodate sensor 110 and block 105b defines a slot to accommodate sensor 110S. The shape of the slot in each block is best shown in cross section in block 105b. The slot extends downwardly from the top of each block as two spaced apart parallel sides 151 and 152. However, the slot instead of having a flat bottom is V-shaped as designated by 153, forming two sides 153a and 153b.

When each of the curved shaped sensors 110 or 110S is placed in its respective slot, it makes contact with each of sides 153a and 153b at two points near its ends, for a total of four contact points. However, since the sensor is tube-shaped the points of contacts are on the sloping sides 153a and 153b of the V-shaped bottom 153, the sensor is equally supported at all four contact points. To further secure each sensor within its respective slot, silicon rubber or the like, designated by 155 is applied to the tops of each of the sensors near its two ends. The housing 104 is shown including a cover plate 105c on top of block 105b, and it has the bottom plate 112, previously described.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a tilt meter of the type which includes at least one sensor forming at least one resistor whose resistance varies according to tilting of the sensor, and means for connecting the resistor of the sensor and other resistors in a Wheatstone bridge arrangement having two sets of terminals, power means for applying an AC signal to a pair of terminals of the bridge, and circuit means connected to the other pair of terminals of the bridge for providing an output of a magnitude related to the tilt magnitude and a polarity related to the tilt direction of the sensor, the improvement wherein:

said AC signal is a square wave, and said bridge responds to said AC signal to produce spike-shaped pulses due to the transitions of said square waves; said circuit means includes detector means for providing said output and means for inhibiting the passage of signals from said bridge to said detector means during a preselected period starting with each transition of said square wave shaped signal from said power means.

2. In a tilt meter of the type as recited in claim 1 wherein said preselected period is not less than the longest expected period of any of said spike-shaped pulses.

3. In a tilt meter of the type as recited in claim 1 wherein said inhibiting means comprises switch means, switchable from a first position to a second position during each of said preselected periods.

4. In a tilt meter of the type as recited in claim 3 wherein said switch means is connected to a preselected reference potential when being in said second position.

5. In a tilt meter of the type as recited in claim 4 wherein said preselected period is not less than the longest expected period of any of said spike-shaped pulses.

6. In a tilt meter of the type as recited in claim 5 wherein said preselected reference potential is ground to thereby effectively ground the input of said detector means.

7. In a tilt meter of the type as recited in claim 1 wherein said circuit means further include first amplifier means having an input terminal connected to said inhibiting means and an output terminal connected to said detector means.

8. In a tilt meter of the type as recited in claim 7 wherein said inhibiting means comprises switch means switchable from a first position to a second position during each of said preselected periods; and
said switch means is connected to a preselected reference potential when being in said second position.

9. In a tilt meter of the type as recited in claim 8 wherein said preselected period is not less than the longest expected period of any of said spike-shaped pulses.

10. In a tilt meter of the type as recited in claim 9 wherein said preselected reference potential is ground.

11. In a tilt meter of the type as recited in claim 1 wherein said circuit means further include differential amplifier means having input terminals connected to the two bridge terminals, which are not connected to said power means, and an output terminal connected to said inhibiting means.

12. In a tilt meter of the type as recited in claim 11 wherein said inhibiting means comprise means having an output terminal, a first terminal connected to the output terminal of said differential amplifier means and a second terminal connectable to a souce of reference potential, said control means including means for applying the signal at said first terminal to said output terminal except during a preselected period following each transition of said square-wave signal, during when said reference potential at said second terminal is applied to said output terminal.

13. In a tilt meter of the type as recited in claim 12 wherein said preselected period is not less than the longest expected period of any of said spike-shaped pulses.

14. In a tilt meter of the type as recited in claim 13 wherein said reference potential is ground.

15. In a tilt meter of the type as recited in claim 12 wherein said circuit means include integrated amplifying means responsive to the signal at the output terminal of said inhibiting means for providing a signal to said detector means.

16. In a tilt meter of the type as recited in claim 15 wherein said preselected period is not less than the longest expected period of any of said spike-shaped pulses.

17. In a tilt meter of the type as recited in claim 10 wherein said reference potential is ground.

* * * * *